(12) United States Patent
Iranpour

(10) Patent No.: US 7,315,486 B2
(45) Date of Patent: Jan. 1, 2008

(54) LIBRARY OF VELOCITY DEPENDENT EXTENDED SPREAD-SPECTRUM CODES

(75) Inventor: Kambiz Iranpour, Oslo (NO)

(73) Assignee: WesternGeco, L.L.C., Houston, TX (US)

(*) Notice: Subject to any disclaimer, the term of this patent is extended or adjusted under 35 U.S.C. 154(b) by 301 days.

(21) Appl. No.: 10/537,718

(22) PCT Filed: Dec. 2, 2003

(86) PCT No.: PCT/EP03/50927

§ 371 (c)(1),
(2), (4) Date: Jun. 3, 2005

(87) PCT Pub. No.: WO2004/053527

PCT Pub. Date: Jun. 24, 2004

(65) Prior Publication Data

US 2006/0034151 A1 Feb. 16, 2006

(30) Foreign Application Priority Data

Dec. 6, 2002 (GB) .................................. 0228484.2

(51) Int. Cl.
*G01V 1/38* (2006.01)
(52) U.S. Cl. .......................................... 367/19; 367/21
(58) Field of Classification Search ................ 367/123, 367/130, 19, 21, 89, 90
See application file for complete search history.

(56) References Cited

U.S. PATENT DOCUMENTS 5,428,581 A 6/1995 Doisy et al.

2004/0233098 A1* 11/2004 Millikin et al. ............... 342/95
2006/0034151 A1* 2/2006 Iranpour ....................... 367/21
2006/0187753 A1* 8/2006 Martin et al. ................. 367/19

FOREIGN PATENT DOCUMENTS

| FR | 2 772 931 | | 6/1999 |
| GB | 2 339 906 A | | 2/2000 |
| WO | WO 03067281 | * | 8/2003 |

OTHER PUBLICATIONS

Court, "Applications of acoustics to source-array and streamer tow-point positioning," Geophysics, 56(4):558-564, Apr. 1991.
Dragoset, "Marine vibrators and the Doppler effect," Geophysicis, 53(11):1388-1398, Nov. 1988.
International Search Report dated May 7, 2004, for Application No. PCT/EP03/50927.
UK Search Report dated Apr. 11, 2003, for Application No. GB 0228484.2.

* cited by examiner

*Primary Examiner*—Daniel Pihulic
(74) *Attorney, Agent, or Firm*—Ari Pramudji; Liangang (Mark) Ye; Jeffrey E. Griffin

(57) ABSTRACT

A method and apparatus is provided for determining a propagation time delay. The apparatus includes at least one source adapted to generate a plurality of positioning signals, at least one receiver deployed along a seismic sensing cable, wherein the receiver is adapted to receive the plurality of positioning signals from the at least one source, and a plurality of computed Doppler-shifted positioning signals corresponding to the plurality of positioning signals. The apparatus also includes a signal processing unit adapted to determine a propagation time delay between the source and the receiver using the generated positioning signals, the received positioning signals, and the plurality of computed Doppler shifted positioning signals.

39 Claims, 9 Drawing Sheets

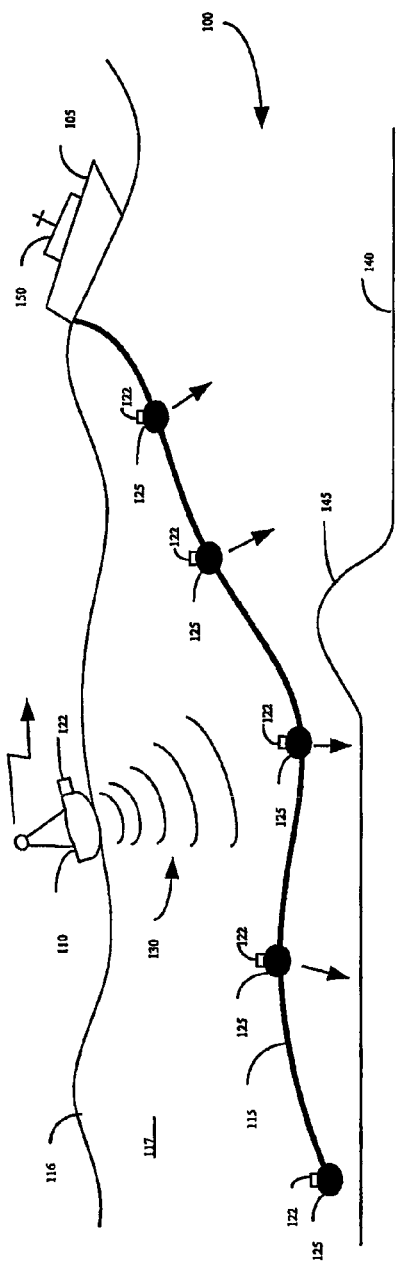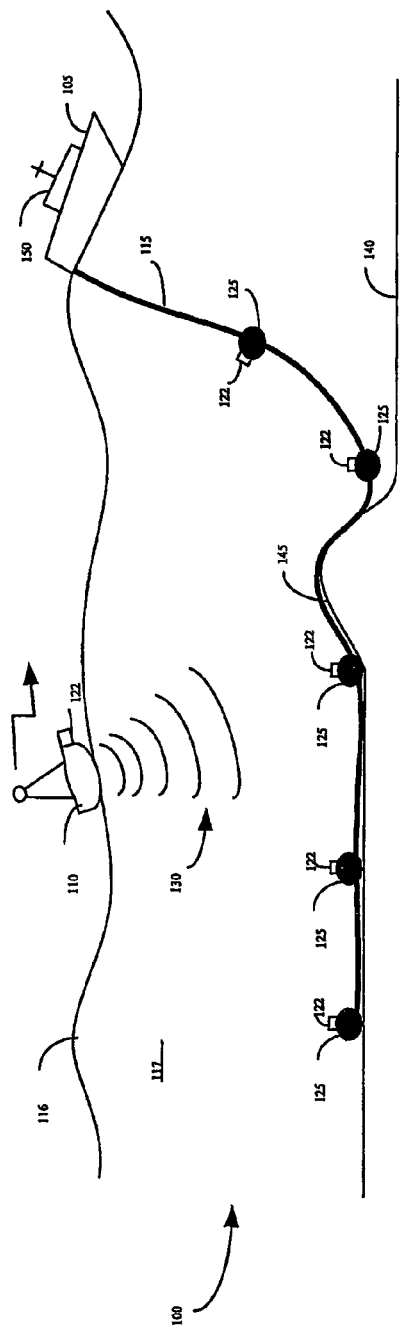
Figure 2A
Figure 2B

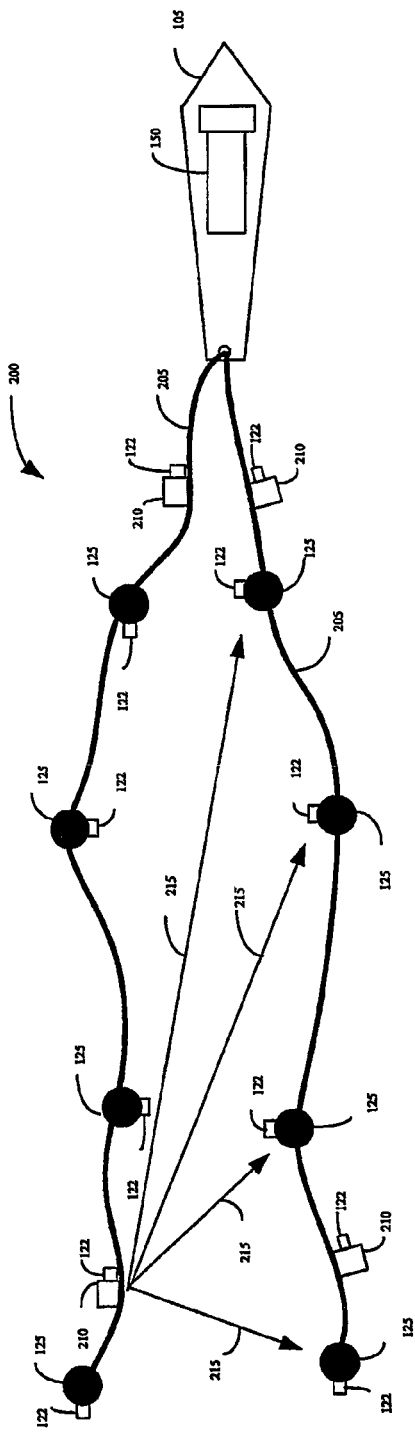
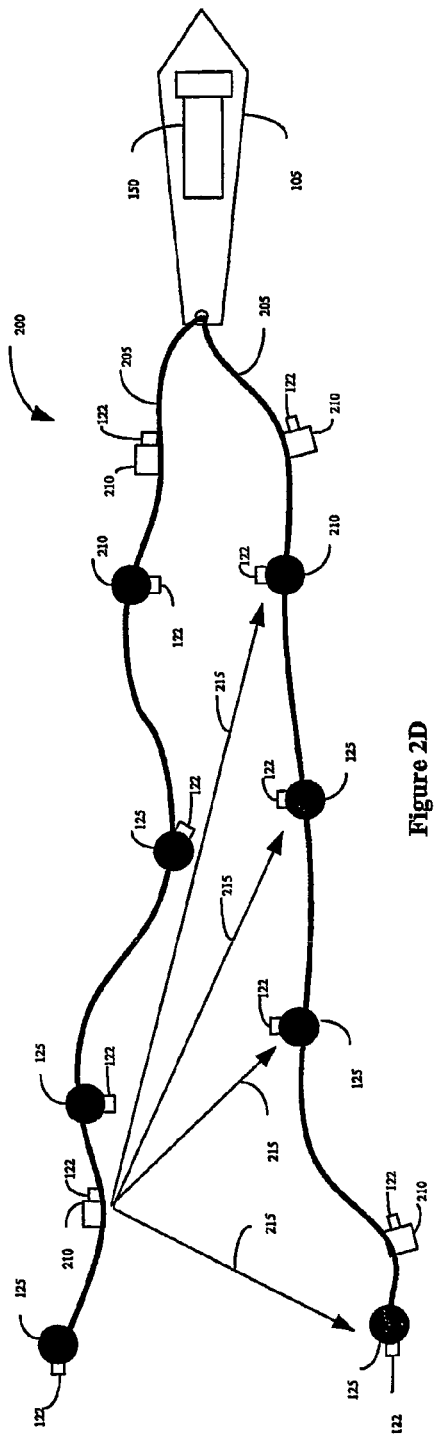

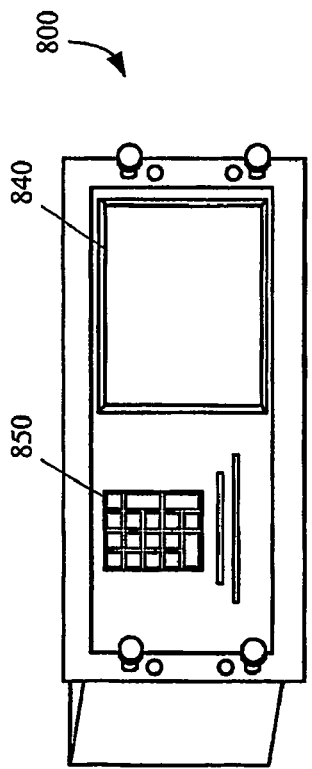
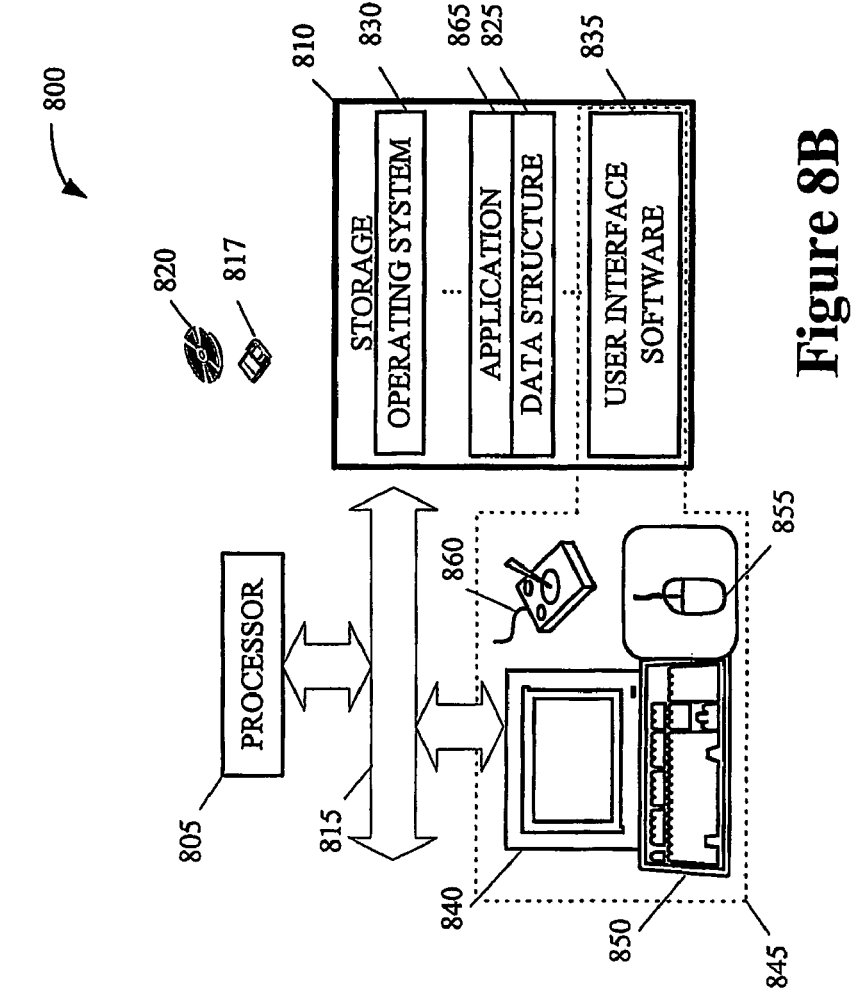

LIBRARY OF VELOCITY DEPENDENT EXTENDED SPREAD-SPECTRUM CODES

BACKGROUND OF THE INVENTION

1. Field of the Invention

This invention relates generally to acoustic ranging, and, more particularly, to acoustic ranging using velocity dependent extended spread-spectrum codes.

2. Description of the Related Art

Underwater seismic exploration is widely used to locate and/or survey subterranean geological formations for hydrocarbon deposits. A survey typically involves deploying one or more seismic sources and one or more seismic sensors at predetermined locations. For example, a seismic cable including an array of seismic sensors may be deployed on the sea floor and a seismic source may be towed along the ocean's surface by a survey vessel. The seismic sources generate acoustic waves that travel to the geological formations, where they are reflected and propagate back to the seismic sensors. The seismic sensors receive the reflected waves, which are then processed to generate seismic data. Analysis of the seismic data may indicate probable locations of geological formations and hydrocarbon deposits.

The accuracy of the seismic analysis may be limited by uncertainties in the seismic source and sensor positions. The positions of deployed seismic sources and seismic sensors may be estimated using modelling techniques that predict the position of the deployed seismic sources. For example, the position of a seismic cable on the sea floor may be estimated using models that consider the physical characteristics of the seismic cable (e.g., weight, diameter, etc.) and the effect of predicted sea currents on the seismic cable as it descends to the sea floor. However, such methods are predicated on a limited knowledge of the properties of water in the catenary, as well as the geology of the sea floor, and thus they only provide an estimate of the seismic cable's location.

A variety of measurement techniques have been developed to determine the position of the seismic sources and the seismic sensors as the seismic sensors descend through the catenary and come to rest on the sea floor. One such technique is time delay estimation, which determines the positions of arrays of seismic sources and seismic sensors by measuring the time it takes for a signal, such as a chirp, to travel between the seismic sources and seismic sensors. For example, an acoustic source may be deployed on a buoy at the sea surface. One or more receivers may be deployed along a seismic cable resting on the sea floor. The distance between the acoustic source and the receivers, and, consequently, the position of the seismic cable, may be determined by cross-correlating a positioning signal emitted by the acoustic source with the positioning signal received by the receivers. The cross-correlation produces a peak in the cross-correlation estimate that corresponds to a time lag caused by propagation of the positioning signal from the acoustic source to the receivers.

The ocean's surface, however, is not an ideal platform for the acoustic sources and/or receivers that are used in time delay estimation. Movement of the acoustic source and/or receiver as it rides the rough sea surface may introduce Doppler shifts into the positioning signal, which may degrade the cross-correlation estimates. Even moderately heavy seas with a significant wave height (SWH) of about 8 meters may accelerate a buoy or vessel to velocities of about 2-3 meters per second. The resulting Doppler shift may destroy the peak in the cross-correlation estimate in up to 60% of the attempted measurements. Similarly, the motion of the seismic cable may degrade the cross-correlation estimates, making it difficult to determine the location of the seismic cable as it descends through the catenary to the sea floor. For example, FIG. 1 shows a model cross correlation estimate 10 calculated with stationary sources and sensors. A peak 20 is evident at a time lag of zero. A second correlation estimate 30 at various time lags is calculated including a Doppler shift, and a peak 40 is evident at a non-zero time lag. The amplitude of the peak 40 is reduced relative to the peak 20 because of the Doppler shift.

SUMMARY OF THE INVENTION

In one aspect of the instant invention, an apparatus is provided for determining a propagation time delay. The apparatus includes at least one source adapted to generate a plurality of positioning signals, at least one receiver deployed along a seismic sensing cable, wherein the receiver is adapted to receive the plurality of positioning signals from the at least one source, and a plurality of computed Doppler-shifted positioning signals corresponding to the plurality of positioning signals. The apparatus also includes a signal processing unit adapted to determine a propagation time delay between the source and the receiver using the generated positioning signals, the received positioning signals, and the plurality of computed Doppler shifted positioning signals.

In another aspect of the present invention, a method is provided for determining a propagation time delay. The method includes generating at least one positioning signal using at least one source, receiving the at least one positioning signal with at least one receiver positioned along a seismic cable, and providing at least one computed Doppler-shifted positioning signal corresponding to the at least one positioning signal. The method also includes determining at least one propagation time delay from the source to the receiver using the generated positioning signal, the received positioning signal, and the at least one computed Doppler-shifted positioning signal.

In yet another aspect of the present invention, a method is provided for forming a library. The method includes determining a plurality of velocities, selecting a plurality of positioning signals, and determining a plurality of computed Doppler-shifted positioning signals for each of the plurality of positioning signals using the plurality of velocities. The method also includes providing an index to the plurality of computed Doppler-shifted positioning signals.

In a further aspect of the present invention, a library including a data structure encoded on a computer-readable storage medium is provided. The library includes a plurality of Doppler-shifted positioning signals formed by determining a plurality of velocities, selecting a plurality of positioning signals, and determining a plurality of computed Doppler-shifted positioning signals for each of the plurality of positioning signals using the plurality of velocities. The library also includes an index of the plurality of computed Doppler-shifted positioning signals.

BRIEF DESCRIPTION OF THE DRAWINGS

The invention may be understood by reference to the following description taken in conjunction with the accompanying drawings, in which like reference numerals identify like elements, and in which:

FIGS. 2A-D each show aspects of first and second exemplary systems for acoustic ranging, in accordance with alternate embodiments of the present invention;

FIG. 8 shows a rack mounted computer system that may be used in the first and second exemplary systems for acoustic ranging.

Figure 1:
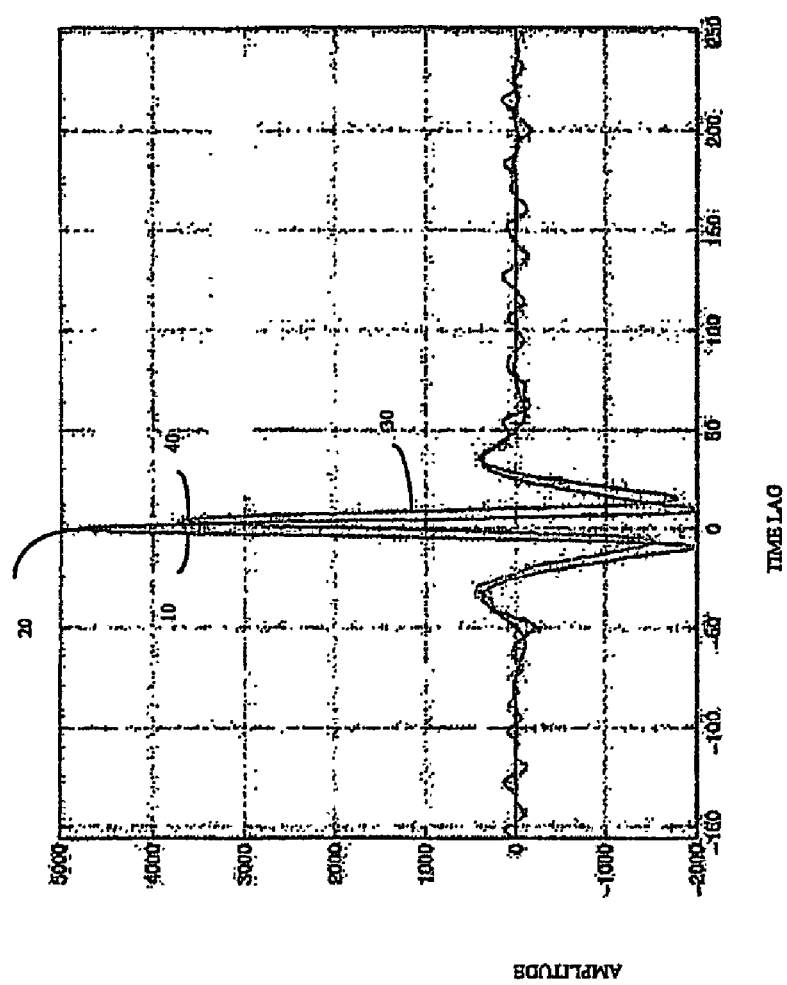
FIG. 1 shows a prior art correlation estimate.

While the invention is susceptible to various modifications and alternative forms, specific embodiments thereof have been shown by way of example in the drawings and are herein described in detail. It should be understood, however, that the description herein of specific embodiments is not intended to limit the invention to the particular forms disclosed, but on the contrary, the intention is to cover all modifications, equivalents, and alternatives falling within the spirit and scope of the invention as defined by the appended claims.

DETAILED DESCRIPTION OF SPECIFIC EMBODIMENTS

Illustrative embodiments of the invention are described below. In the interest of clarity, not all features of an actual implementation are described in this specification. It will of course be appreciated that in the development of any such actual embodiment, numerous implementation-specific decisions must be made to achieve the developers' specific goals, such as compliance with system-related and business-related constraints, which will vary from one implementation to another. Moreover, it will be appreciated that such a development effort might be complex and time-consuming, but would nevertheless be a routine undertaking for those of ordinary skill in the art having the benefit of this disclosure.

Referring now to FIGS. 2A-B, a first exemplary system 100 for determining a propagation time delay is shown, in accordance with a first embodiment of the present invention. In the illustrated embodiment, the first exemplary system 100 includes, but is not limited to, a survey vessel 105, a source 110, and a seismic cable 115. The survey vessel 105 may be deployed on a surface 116 of a body of water 117, which, in alternative embodiments, may be freshwater, sea water, or brackish water. Similarly, the source 110 may be deployed in any desirable manner at or near the surface 116 of the body of water 117. For example, the source 110 may be mounted on the survey vessel 105, suspended beneath a buoy, towed behind a second vessel, or deployed in any like manner. It will further be appreciated that more than one source 110 may be deployed without departing from the scope of the present invention. In one embodiment, a velocity meter 122 may be coupled to the source 110, although this is not necessary for the practice of the present invention.

The seismic cable 115 includes one or more sensors 125. The sensors 125 receive a variety of signals, including, but not limited to positioning signals 130, seismic signals (not shown), and the like. In particular, the sensors 125 are designed to receive at least the positioning signals 130 generated by the source 110. In one embodiment, the sensors 125 may also receive reflected seismic signals (not shown) that may be analysed to locate and/or survey geologic formations such as hydrocarbon deposits. Velocity meters 122 may also be coupled to the sensors 125, although this is not necessary for the practice of the present invention. The seismic cable 115 may be deployed from the survey vessel 105 by any of a variety of means well-known to those of ordinary skill in the art, including, but not limited to, spooling the seismic cable 115 from the stem of the survey vessel 105 as the survey vessel 105 moves across the surface 116 of the body of water 117. In one embodiment, as the seismic cable 115 is being deployed, the seismic cable 115 descends through the catenary until it reaches the floor 140 of the body of water 117.

The size and shape of the seismic cable 115, currents in the body of water 117, and other like factors may influence the path the seismic cable 115 takes on its descent through the catenary. For example, and as illustrated by the arrows in FIG. 2A, portions of the seismic cable 115 may descend at different speeds and in different directions. Although FIG. 2A only shows the vertical variations in the rate of descent and position of the seismic cable 115, it will be appreciated that an actual seismic cable 115 may also move horizontally and that the horizontal motion and position of the seismic cable 115 may vary along the length of the seismic cable 115. Similarly, irregularities in a floor 140 under the body of water 117, such as a bump 145 shown in FIGS. 2A-B, may influence the position of the seismic cable 115 as it rests upon the floor 140.

The conditions in the body of water 117, as well as the geometry of the floor 140, may not be known in advance. These unknown and/or unforeseen conditions may determine the path of the seismic cable 115 as it descends through the catenary and the position of the seismic cable 115 as it rests upon the floor 140. Consequently, it may not be possible to predict the exact location of the seismic cable 115 during and after deployment. The accuracy of seismic surveys may, however, depend upon an accurate knowledge of the location of the seismic cable 115.

To determine the position of the seismic cable 115, the source 110 generates at least one positioning signal 130 that is received by the one or more sensors 125 positioned along the seismic cable 115. Virtually any positioning signal 130 now known or known in the future to the art may be used. In one embodiment, the generated positioning signal 130 is a spread-spectrum sequence. For example, the generated positioning signal 130 may be one of an orthogonal set of sequences, such as a Kasami sequence, a Maximal sequence, and the like. It will be appreciated that sequences are sometimes referred to as codes. As used hereinafter, the term "sequence" will be understood to refer to sequences, codes, and the like.

The received positioning signal and the generated positioning signal 130 may then be communicated to a signal processing unit 150. For example, in one embodiment, the source 110 and/or the sensors 125 may communicate the received positioning signal and the generated positioning signal 130 to the signal processing unit 150 via a data telemetry unit (not shown) included in the source 110 and/or the sensors 125. However, in alternative embodiments, the received positioning signal and the generated positioning signal 130 may be communicated to the signal processing unit 150 by any desirable means such as radio-frequency transmissions, optical devices, and the like.

The signal processing unit 150 may correlate the received positioning signal and the generated positioning signal 130 in a conventional manner well-known to those of ordinary skill in the art having benefit of the present disclosure. For example, as discussed in more detail below, the signal processing unit 150 may form a cross-correlation estimate by cross-correlating the received positioning signal and the generated positioning signal 130. A peak in the cross-correlation estimate corresponding to a propagation time lag may be used to determine the location of the seismic cable 115. Although the signal processing unit 150 depicted in FIGS. 2A-B is positioned on the vessel 105, the present invention is not so limited. In alternative embodiments, portions of the signal processing unit 150 may be positioned in the seismic cable 115, on the source 110, on the survey vessel 105, or at any other desirable location without departing from the scope of the present invention.

As described in more detail below, computed Doppler-shifted positioning signals (not shown) corresponding to the positioning signals 130 are also provided, in accordance with the first embodiment of the present invention. The computed Doppler-shifted positioning signals may then be correlated with the received positioning signal and/or the generated positioning signal 130 to determine the position of the sensors 125 on the seismic cable 115. Consequently, the present invention may be used for determining a propagation time delay between the source 110 and the sensors 125. Thus, it may be possible to determine the position of the seismic cable 115 in situations wherein movement of the source 110, the survey vessel 105, the cable 115, and/or the sensors 125 Doppler shifts the frequencies of the received signal and/or the positioning signal 130.

Referring now to FIGS. 2C-D, a second exemplary system 200 for determining a propagation time delay, in accordance with a second embodiment of the present invention, is shown. The survey vessel 105 in the second exemplary system 200 may, in one embodiment, deploy a plurality of streamer cables 205 at or near the surface 116 of a body of water 117, which, in alternative embodiments, may be freshwater, sea water, or brackish water. In alternative embodiments, the streamer cables 205 may be deployed below the surface of the body of water 117. The streamer cables 205 include a plurality of sensors 125. In one embodiment, velocity meters 122 are coupled to the sensors 125. Although two streamer cables 205 are shown in FIGS. 2C-D, the present invention is not so limited. In alternative embodiments, more or fewer streamer cables 205 may be deployed without departing from the scope of the present invention.

One or more transceivers 210 are coupled to the streamer cables 205. As with the first embodiment illustrated in FIGS. 2A-B, the transceivers 210 may, in one embodiment, generate and transmit positioning signals 215. The positioning signals 215 may be received by one or more of the sensors 125. Virtually any positioning signal 215 now known or known in the future to the art may be used. In one embodiment, the positioning signals 215 are spread-spectrum sequences. For example, the positioning signals 215 may be orthogonal sequences, such as Kasami sequences, Maximal sequences, and the like. However, it will be appreciated that the functions of generating and transmitting need not be embodied in a single device. In alterative embodiments, the transceivers 210 may include independent devices (not shown) for generating and transmitting. The streamer cables 205 may be deployed by any desirable means including, but not limited to, spooling the streamer cables 205 from the stem of the survey vessel 105. Although not necessary for the practice of the present invention, velocity meters 122 may be coupled to the transceivers 210.

During and after deployment of the streamer cables 205, the size and shape of the streamer cable 205, currents in the body of water 117, the velocity of the survey vessel 105, and other like factors may cause the streamer cable 205 to move unpredictably through the water, as shown in FIGS. 2C-D. The accuracy of measurements made by various devices (not shown) attached to the streamer cables 205 may, however, depend upon an accurate knowledge of the relative position of the plurality of the streamer cables 205 and/or the absolute position of the streamer cables 205. Thus, the generated and received positioning signal 215 may be communicated to the signal processing unit 150. For example, the transceivers 210 and the sensors 125 may communicate the generated and received positioning signals 215, respectively, to the signal processing unit 150 via a data telemetry unit (not shown) included in the transceivers 210 and/or the sensors 125.

The signal processing unit 150 may determine the relative and/or absolute locations of the streamer cables 205 by cross-correlating the generated and received positioning signals 215. Although the signal processing unit 150 depicted in FIGS. 2A-D is positioned on the survey vessel 105, the present invention is not so limited. In alternative embodiments, portions of the signal processing unit 150 may be positioned in the transceivers 210, the sensors 125, the streamer cables 205, on the survey vessel 105, or at any other desirable location without departing from the scope of the present invention.

As described in more detail below, computed Doppler-shifted positioning signals (not shown) corresponding the positioning signals 215 are also provided, in accordance with the second embodiment of the present invention. The computed Doppler-shifted positioning signals may then be correlated with the received positioning signal and/or the generated positioning signal 215 to determine the absolute and/or relative positions of the transceivers 210 and the sensors 125 on the seismic cables 205. Consequently, the present invention may be used for determining a propagation time delay between the various transceivers 210 and sensors 125. Thus, it may be possible to determine the absolute and/or relative positions of the seismic cables 205 in situations wherein movement of the survey vessel 105, the cables 205, the sensors 125 and/or the transceivers 210 Doppler shifts the frequencies of the received signal and/or the positioning signal 215.

The source 110 and/or the transceivers 210 shown in FIGS. 2A-D may generate a plurality of positioning signals 130, 215. In one embodiment, the plurality of positioning signals 130, 215 are separable. The term "separable," as used hereinafter, will be understood to mean that the cross-correlation of a first separable positioning signal 130, 215 with a second separable positioning signal 130, 215 is negligible. In one embodiment, the positioning signals 130, 215 are orthogonal spread-spectrum sequences, which may be transmitted and/or received while other positioning signals 130, 215 are also being transmitted and/or received. In particular, the plurality of positioning signals 130, 215 may be transmitted and/or received simultaneously.

In one embodiment, a Maximal sequence may be used to form the orthogonal positioning signal 130, 215. The Maximal sequence may include a plurality of elements and each element in the Maximal sequence may be a +1 or a −1, i.e. the Maximal sequence is a binary sequence. By selecting an appropriate series of elements, each generated Maximal sequence may be used as the orthogonal positioning signal 130, 215 in a manner well-known in the art having the benefit of this disclosure. However, in alternative embodiments, any desirable sequence, such as a Kasami sequence, may be used as the orthogonal positioning signals 130, 215 without departing from the scope of the present invention.

Figure 3:
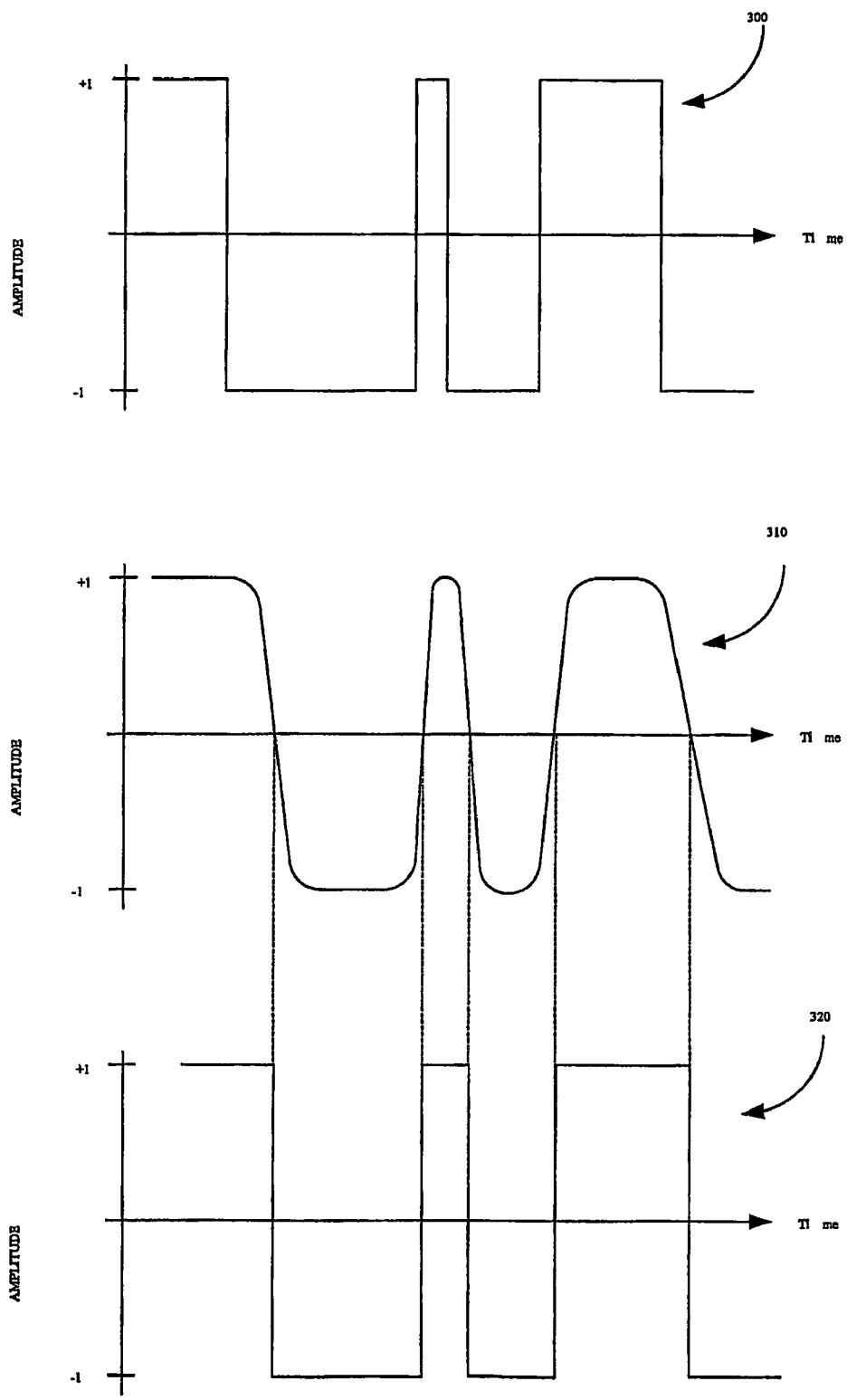
FIG. 3 shows an illustrative example of a positioning signal that may be used by the systems shown in FIGS. 2A-D, in accordance with one embodiment of the present invention.

Referring now to FIG. 3, an exemplary binary sequence 300 is shown. The binary sequence 300 varies from +1 to −1 with time and can be Doppler transformed to form the Doppler-shifted sequence 310. Sequences in general, and Maximal and Kasami sequences in particular, are not necessarily Doppler invariant, as will be appreciated by those of ordinary skill in the art having the benefit of this disclosure. Consequently, the Doppler-shifted sequence 310 may not be a binary sequence. As illustrated in FIG. 3, the Doppler-shifted sequence 310 takes on amplitude values that are not always equal to +1 or −1.

In one embodiment, the Doppler-shifted sequence 310 is converted into a binary Doppler-shifted sequence 320 using a threshold that is set equal to zero. When the amplitude of the Doppler-shifted sequence 310 is greater than the threshold value of zero, the binary Doppler-shifted sequence 320 is set to +1. When the amplitude of the Doppler-shifted sequence 310 is less than the threshold value of zero, the binary Doppler-shifted sequence 320 is set to −1. The binary Doppler-shifted sequence 320 formed using the threshold may be correlated with the positioning signals 130, 215 to determine the position of the sensors 125 and/or transceivers 210 on the seismic cable 115. However, it will be appreciated that the value of the threshold is not material to the present invention and any desirable threshold may be used without departing from the scope of the present invention.

Figure 4:
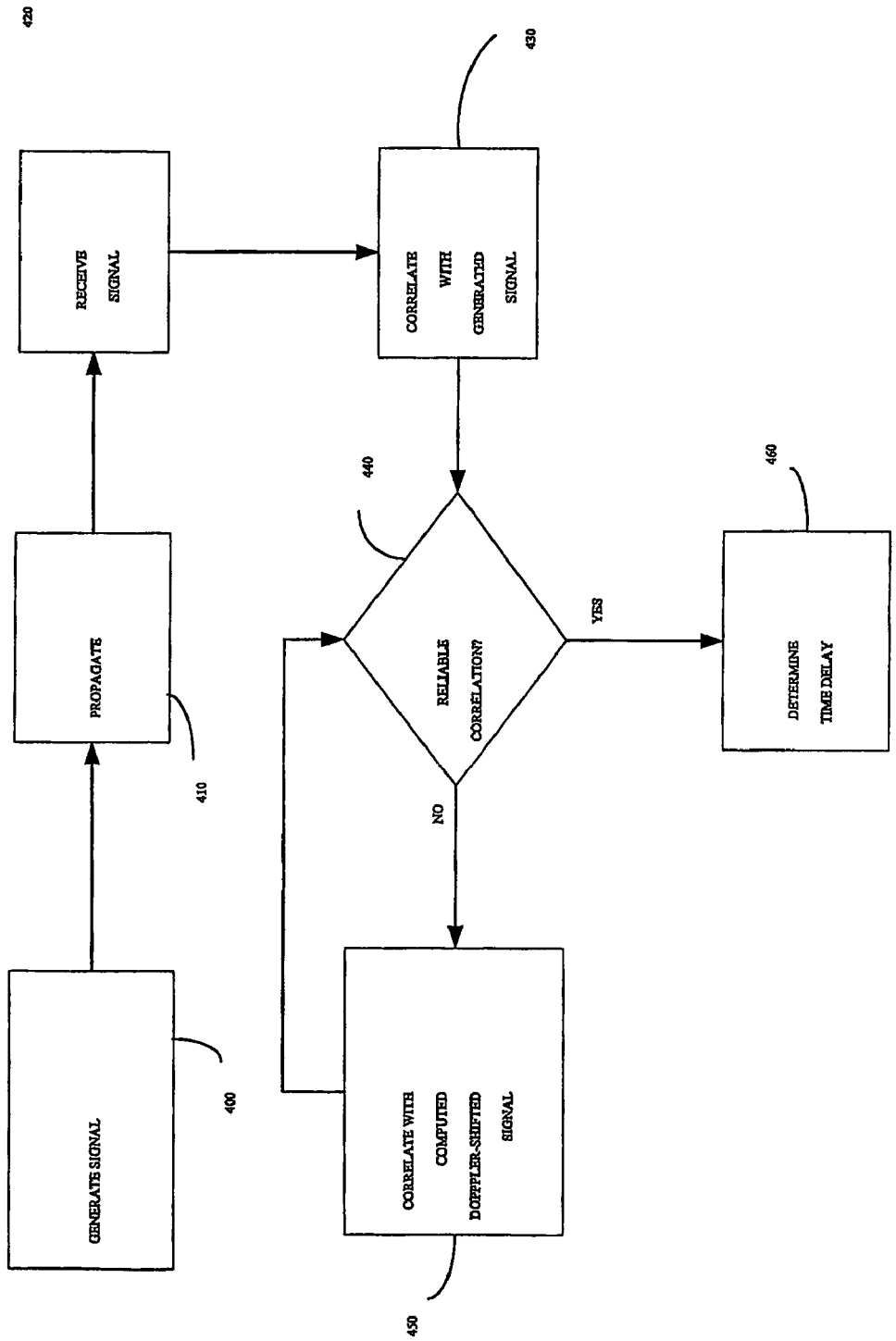
FIG. 4 shows a method of acoustic ranging, in accordance with one embodiment of the present invention.

FIG. 4 shows a method of acoustic ranging, in accordance with one embodiment of the present invention. The source 110 and/or transceivers 210 generate (at 400) the positioning signal 130, 215. In one embodiment, the positioning signals 130, 215 are orthogonal sequences. For example, as discussed above, the positioning signal 130, 215 may be a Maximal sequence, a Kasami sequence, and the like. The positioning signals 130, 215 then propagate (at 410) to the sensors 125 and/or the transceivers 210.

The sensors 125 receive (at 420) the positioning signals 130, 215. The received positioning signals 130, 215 are then provided to the signal processing unit 150, which correlates (at 430) the generated and received positioning signals 130, 215. In one embodiment, the signal processing unit 150 cross-correlates (at 430) the generated and received positioning signals 130, 210. The signal processing unit 150 then determines (at 440) whether the correlation is reliable. For example, as discussed above, the Doppler shift of the generated and received positioning signals 130, 215 may make the cross-correlation of the generated and received positioning signals 130, 215 unreliable. If the correlation is unreliable, the signal processing unit 150 correlates (at 450) the received positioning signals 130, 215 with one or more computed Doppler-shifted positioning signals and then determines (at 440) whether the correlation is reliable. In one embodiment the reliability of the correlation may be determined using an amplitude threshold applied to the main peak of the correlation estimate. In an alternative embodiment, the reliability of the correlation may be determined using a peak-to-side-lobe ratio.

Once the received positioning signals 130, 215 have been reliably correlated (at 450) with one or more computed Doppler-shifted positioning signals, the signal processing 150 unit uses the correlated signals to determine (at 460) a propagation time delay between the source 110 or the transceiver 210 and the sensors 125.

Figure 5:
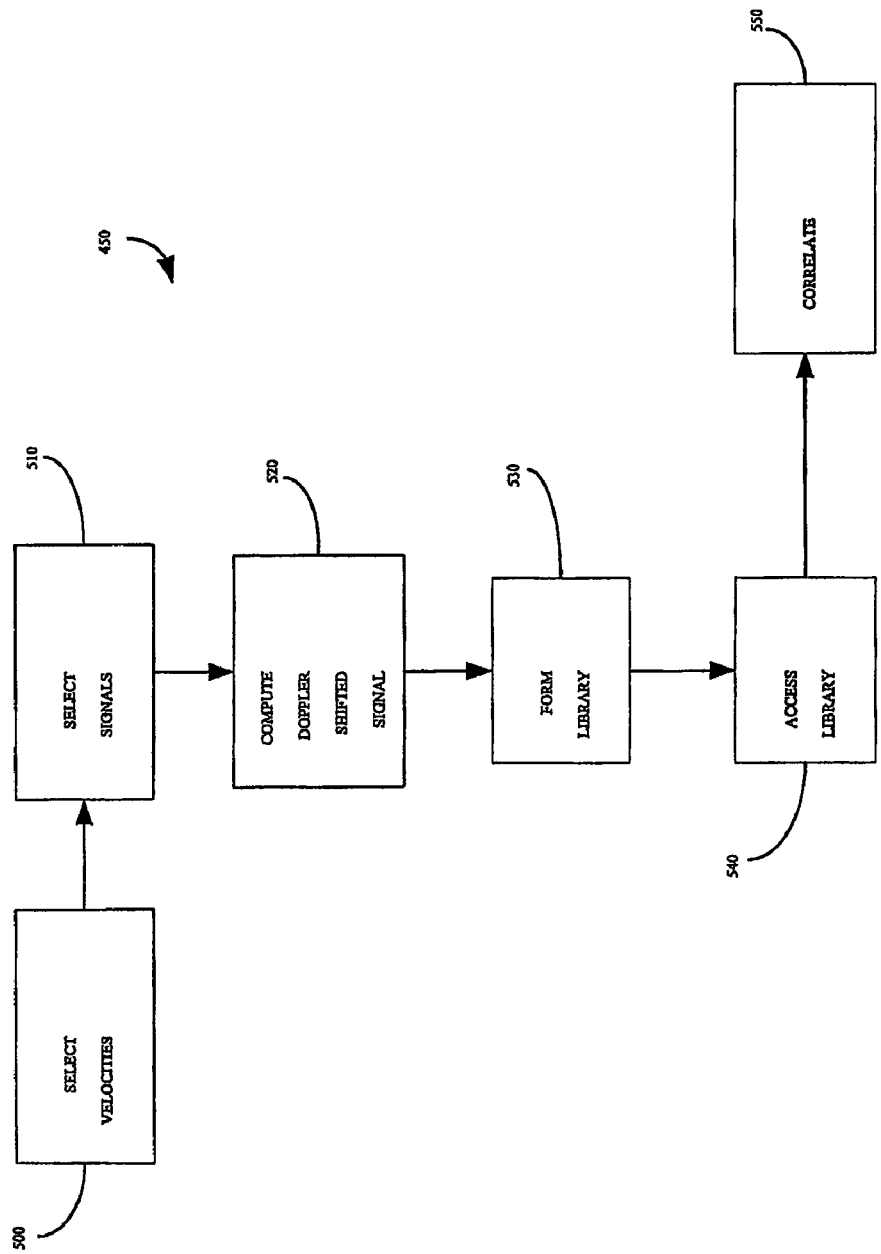
FIG. 5 shows a first method of correlating that may be used as a part of the method shown in FIG. 4.

Referring now to FIG. 5, a first method of correlating (at 450) the received positioning signals 130, 215 with one or more computed Doppler-shifted positioning signals is illustrated. In the first method, a plurality of velocities is selected (at 500). In one embodiment, selecting (at 500) the plurality of velocities includes selecting a range of velocities and a velocity resolution. For example, the selected velocities may range from 4 meters/second to −4 meters/second and the velocity resolution may be 1 meter/second. However, the present invention is not so limited. Any desirable process of selecting the velocities may be used, including manually selecting velocities, using a velocity dependent resolution, adaptively varying the velocity resolution and/or range to account for changing conditions, and the like.

A plurality of positioning signals 130, 215 are selected (at 510) such that at least one of the selected positioning signals 130, 215 will correspond to the positioning signal generated (at 400) by the source 110 and/or transceivers 210. The computed Doppler-shifted positioning signals are computed (at 520) using the plurality of velocities and the selected positioning signals 130, 215. For example, if 10 velocities are selected and 10 positioning signals are selected, then 100 computed Doppler-shifted positioning signals are formed. In one embodiment, computing (at 520) the Doppler-shifted positioning signals 130, 215 may also include forming binary computed Doppler-shifted positioning signals, as described above.

Figure 6:
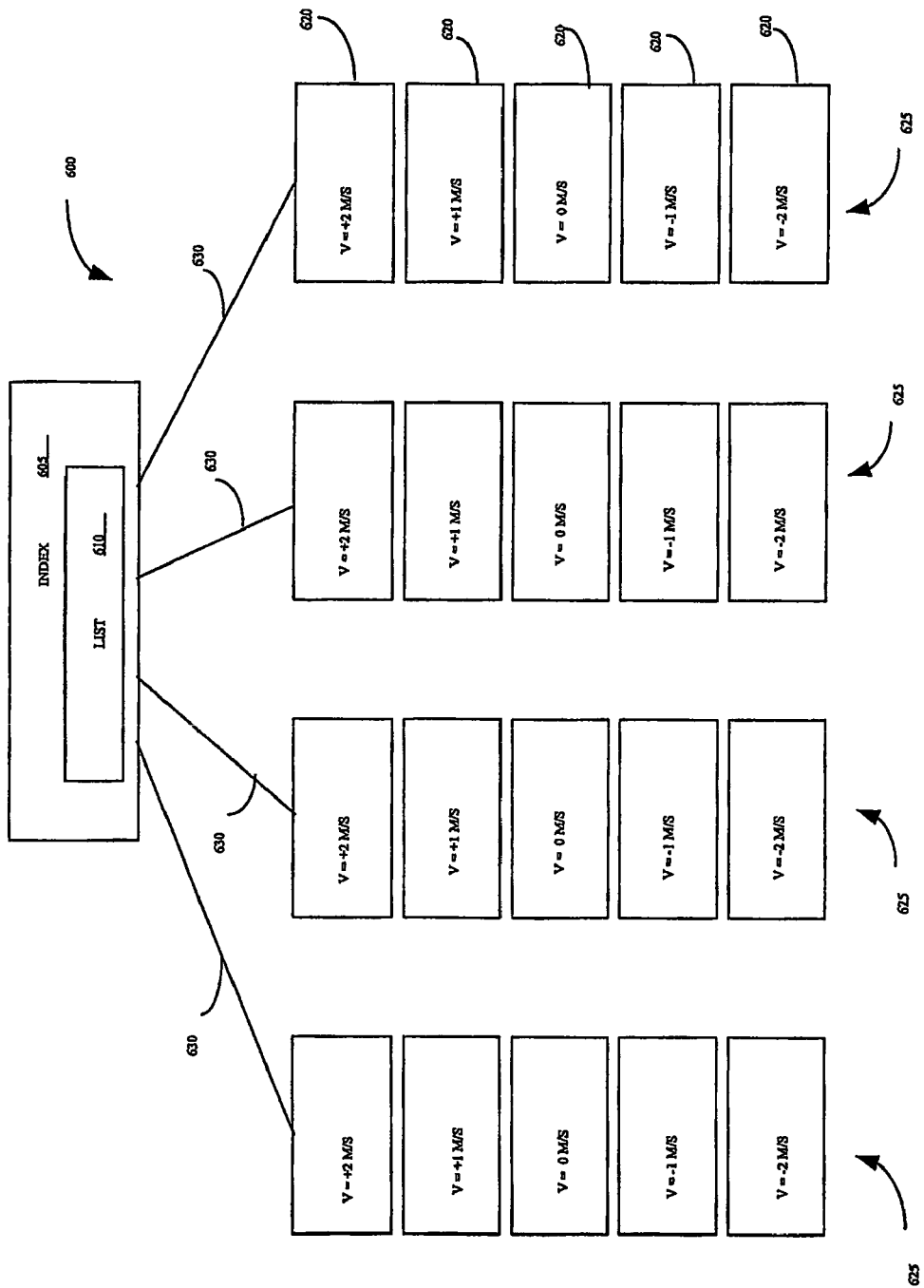
FIG. 6 shows a library that may be used by the first method of correlating shown in FIG. 5.

Referring now to FIG. 6, the plurality of computed Doppler-shifted positioning signals is then used to form (at 530) a library 600, in accordance with one aspect of the present invention. In one embodiment, forming (at 530) the library 600 includes creating an index 605, which may include a list 610 of entries 620 and links 630 to the entries 620. In one embodiment, each entry 620 may be grouped into one of a plurality of sets 625, which correspond to one of the plurality of computed Doppler-shifted positioning signals. For example, if five velocities (V=+2, +1, 0, −1, and −2 meters/second) are selected (at 500) and four positioning signals 130, 215 are selected (at 510), then the library 600 includes 4 sets 625 comprising 20 entries 620. In various embodiments, the library 600 may be stored in digital form on any of a variety of computer-readable storage media, including compact disks, computer hard disk memory, digital tape, and the like.

Using the library 600, a selected one of the plurality of computed Doppler-shifted positioning signals stored in one of the plurality of entries 620 may be accessed (at 540) and the selected computed Doppler-shifted positioning signal may be correlated (at 550) with the received positioning signal 130, 215, as discussed above.

It will be noted that the various steps described above with regard to the first method of correlating (at 450) the received positioning signals 130, 215 with one or more computed Doppler-shifted positioning signals may be carried out at any desirable time. In one embodiment, the library 600 may be formed (at 530) before the acoustic ranging process is carried out. For example, the library 600 may be formed (at 530) before the survey vessel 105 departs and stored on a storage medium (not shown) that can be carried on the survey vessel 105. The library 600 may then be accessed (at 540) while a seismic survey is being conducted or after the seismic survey is complete. In an alternative embodiment, the library 600 may be formed (at 530) during the acoustic ranging process.

Figure 7:
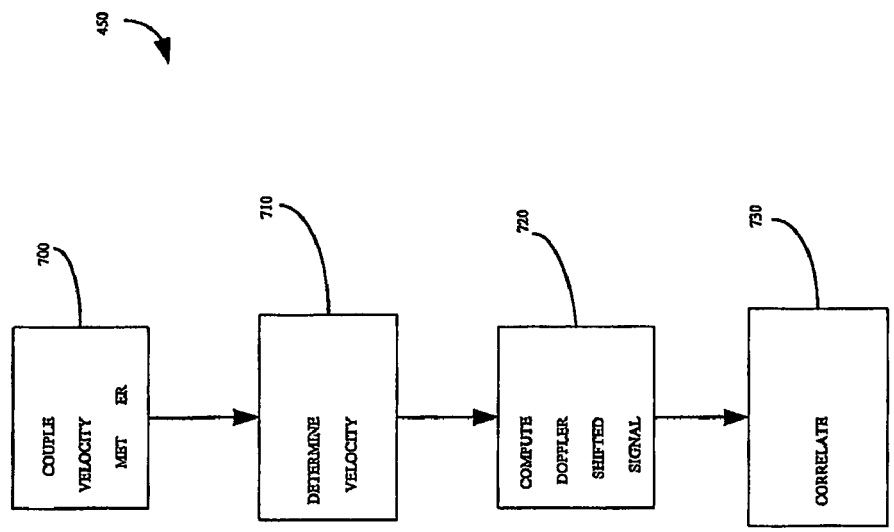
FIG. 7 shows a second method of correlating that may be used as a part of the method shown in FIG. 4, in accordance with one embodiment of the present invention.

Referring now to FIG. 7, a second method of correlating (at 450) the received positioning signals 130, 215 with one or more computed Doppler-shifted positioning signals is illustrated As discussed above, in one embodiment, one or more velocity meters 122 are coupled (at 700) to the seismic sources 110, sensors 125, and/or transceivers 210. The velocity meters 122 determine (at 710) one or more velocities of the seismic sources 110, sensors 125, and/or transceivers 210. The one or more velocities are determined (at 710) at substantially simultaneously with the generation (at 400) of the positioning signals 130, 215. In this context, "substantially simultaneously" means that computing (at 720) the Doppler-shifted positioning signals 130, 215 using the determined velocities and then correlating (at 730) the received positioning signals 130, 215 and the computed Doppler-shifted positioning signals results in a determination of the relative and/or absolute positions of the seismic sources 110, sensors 125, and/or transceivers 210. It will therefore be appreciated that the term "substantially simultaneously" may include time delays between generation (at 400) of the positioning signals 130, 215 and determining (at 710) one or more velocities of the seismic sources 110, sensors 125, and/or transceivers 210. The time delays may vary depending on such conditions as the velocity of the survey vessel 105, the significant wave height, water currents, and the like.

By using the positioning signal 130, 215, or a plurality of positioning signals 130, 215, in the manner described above, the performance of acoustic ranging systems, such as the first exemplary system 100 and the second exemplary system 200, may be improved. For example, in rough seas having a significant wave height (SWH) of about 8 meters, which may accelerate a buoy or vessel to velocities of at least about 2-3 meters per second, the present invention may allow the relative and/or absolute positions of the source 110, the sensors 125, and/or the transceivers 210 to be determined. Thus, it may be possible to determine the position of the seismic cables 115, 205 in situations wherein movement of the survey vessel 105, the source 110, the cables 115 and 205, the sensors 125, and/or the transceivers 210 Doppler shifts the frequencies of the received signal and/or the positioning signal 130, 215.

The survey vessel 105 is equipped with a rack-mounted computing apparatus 800, illustrated in FIGS. 8A-B with which at least a portion of signal processing unit 150 (shown in FIGS. 2A-D) is implemented. The computing apparatus 800 includes a processor 805 communicating with some storage 810 over a bus system 815. The storage 810 may include a hard disk and/or random access memory ("RAM") and/or removable storage such as a floppy magnetic disk 817 and an optical disk 820. The storage 810 is encoded with a data structure 825 storing the data set acquired as discussed above, an operating system 830, user interface software 835, and an application 865. The user interface software 835, in conjunction with a display 840, implements a user interface 845. The user interface 845 may include peripheral I/O devices such as a key pad or keyboard 850, a mouse 855, or a joystick 860. The processor 805 runs under the control of the operating system 830, which may be practically any operating system known to the art. The application 865 is invoked by the operating system 830 upon power up, reset, or both, depending on the implementation of the operating system 830.

Some portions of the detailed descriptions herein are consequently presented in terms of a software implemented process involving symbolic representations of operations on data bits within a memory in a computing system or a computing device. These descriptions and representations are the means used by those in the art to most effectively convey the substance of their work to others skilled in the art The process and operation require physical manipulations of physical quantities. Usually, though not necessarily, these quantities take the form of electrical, magnetic, or optical signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated or otherwise as may be apparent, throughout the present disclosure, these descriptions refer to the action and processes of an electronic device, that manipulates and transforms data represented as physical (electronic, magnetic, or optical) quantities within some electronic device's storage into other data similarly represented as physical quantities within the storage, or in transmission or display devices. Exemplary of the terms denoting such a description are, without limitation, the terms "processing," "computing," "calculating," "determining," "displaying," and the like.

Note also that the software implemented aspects of the invention are typically encoded on some form of program storage medium or implemented over some type of transmission medium. The program storage medium may be magnetic (e.g., a floppy disk or a hard drive) or optical (e.g., a compact disk read only memory, or "CD ROM"), and may be read only or random access. Similarly, the transmission medium may be twisted wire pairs, coaxial cable, optical fibre, or some other suitable transmission medium known to the art. The invention is not limited by these aspects of any given implementation.

This concludes the detailed description. The particular embodiments disclosed above are illustrative only, as the invention may be modified and practiced in different but equivalent manners apparent to those skilled in the art having the benefit of the teachings herein. Furthermore, no limitations are intended to the details of construction or design herein shown, other than as described in the claims below. It is therefore evident that the particular embodiments disclosed above may be altered or modified and all such variations are considered within the scope and spirit of the invention. Accordingly, the protection sought herein is as set forth in the claims below.

The invention claimed is:

1. An apparatus for determining a propagation time delay, comprising:
    at least one source adapted to generate a plurality of positioning signals;
    at least one receiver deployed along a seismic sensing cable, wherein the receiver is adapted to receive the plurality of positioning signals from the at least one source;
    a library comprising a plurality of sets of computed Doppler-shifted positioning signals, each set corresponding to one of the plurality of positioning signals; and
    a signal processing unit adapted to determine a propagation time delay between the source and the receiver using the generated positioning signals, the received positioning signals, and the plurality of computed Doppler shifted positioning signals.

2. The apparatus of claim 1, wherein each computed Doppler-shifted positioning signal in each of the plurality of sets comprises a computed Doppler-shifted positioning signal indicative of one of a plurality of velocities.

3. An apparatus for determining a propagation time delay, comprising:
   at least one source adapted to generate a plurality of positioning signals:
   at least one receiver deployed along a seismic sensing cable, wherein the receiver is adapted to receive the plurality of positioning signals from the at least one source;
   a library having a plurality of sets of computed Doppler-shifted positioning signals corresponding to the plurality of positioning signals, wherein each set corresponds to one of the plurality of positioning signals, wherein each computed Doppler-shifted positioning signal in each set is indicative of one of a plurality of velocities, wherein the plurality of velocities comprises a range of velocities having a velocity resolution; and
   a signal processing unit adapted to determine a propagation time delay between the source and the receiver using the generated positioning signals, the received positioning signals, and the plurality of computed Doppler shifted positioning signals.

4. An apparatus for determining a propagation time delay, comprising:
   at least one source adapted to generate a plurality of positioning signals:
   at least one receiver deployed along a seismic sensing cable, wherein the receiver is adapted to receive the plurality of positioning signals from the at least one source;
   a plurality of computed Doppler-shifted positioning signals corresponding to the plurality of positioning signals:
   a signal processing unit adapted to determine a propagation time delay between the source and the receiver using the generated positioning signals, the received positioning signals, and the plurality of computed Doppler shifted positioning signals; and
   at least one first velocity meter coupled to the at least one source, wherein the plurality of computed Doppler-shifted positioning signals are generated using the first velocity meter.

5. An apparatus for determining a propagation time delay, comprising:
   at least one source adapted to generate a plurality of positioning signals having a plurality of sequences;
   at least one receiver deployed along a seismic sensing cable, wherein the receiver is adapted to receive the plurality of positioning signals from the at least one source;
   a plurality of computed Doppler-shifted positioning signals corresponding to the plurality of positioning signals; and
   a signal processing unit adapted to determine a propagation time delay between the source and the receiver using the generated positioning signals, the received positioning signals, and the plurality of computed Doppler shifted positioning signals.

6. The apparatus of claim 5, wherein the plurality of sequences comprises a plurality of separable sequences.

7. The apparatus of claim 6, wherein the plurality of separable sequences comprises a plurality of substantially orthogonal sequences.

8. The apparatus of claim 7, wherein the plurality of substantially orthogonal sequences comprises at least one of a plurality of Kasami sequences and a plurality of Maximal sequences.

9. An apparatus for determining a propagation time delay, comprising:
   at least one source adapted to generate a plurality of positioning signals;
   at least one receiver deployed along a seismic sensing cable, wherein the receiver is adapted to receive the plurality of positioning signals from the at least one source;
   a plurality of computed Doppler-shifted positioning signals corresponding to the plurality of positioning signals; and
   a signal processing unit adapted to determine a propagation time delay between the source and the receiver using the generated positioning signals, the received positioning signals, and the plurality of computed Doppler shifted positioning signals, wherein the signal processing unit is adapted to determine the propagation time delay by cross-correlating the generated positioning signal and the received positioning signal.

10. An apparatus for determining a propagation time delay, comprising:
    at least one source adapted to generate a plurality of positioning signals;
    at least one receiver deployed along a seismic sensing cable, wherein the receiver is adapted to receive the plurality of positioning signals from the at least one source;
    a plurality of computed Doppler-shifted positioning signals corresponding to the plurality of positioning signals; and
    a signal processing unit adapted to determine a propagation time delay between the source and the receiver using the generated positioning signals, the received positioning signals, and the plurality of computed Doppler shifted positioning signals, wherein the signal processing unit is adapted to determine the propagation time delay by cross-correlating the received positioning signal with at least one computed Doppler-shifted positioning signal.

11. A method for determining a propagation time delay, comprising:
    generating at least one positioning signal using at least one source;
    receiving the at least one positioning signal with at least one receiver positioned along a seismic cable;
    determining at least one velocity;
    determining at least one computed Doppler-shifted positioning signal using the at least one positioning signal and the at least one velocity; and
    determining at least one propagation time delay from the source to the receiver using the generated positioning signal, the received positioning signal, and the at least one computed Doppler-shifted positioning signal.

12. The method of claim 11, wherein determining the at least one propagation time delay comprises cross-correlating the generated positioning signal and the received positioning signal.

13. The method of claim 11, wherein determining the at least one propagation time delay comprises cross-correlating the received positioning signal with the at least one computed Doppler-shifted positioning signal.

14. The method of claim 11, wherein determining the at least one computed Doppler-shifted positioning signal comprises:
    forming a library using the at least one computed Doppler-shifted positioning signal; and
    accessing the library.

15. The method of claim 14, wherein forming the library comprises providing an index to the at least one computed Doppler-shifted positioning signal.

16. A method for determining a propagation time delay, comprising:
generating at least one positioning signal using at least one source;
coupling a first velocity meter to the source;
receiving the at least one positioning signal with at least one receiver positioned along a seismic cable;
providing at least one computed Doppler-shifted positioning signal corresponding to the at least one positioning signal; and
determining at least one propagation time delay from the source to the receiver using the generated positioning signal, the received positioning signal, and the at least one computed Doppler-shifted positioning signal.

17. The method of claim 16, wherein providing the at least one computed Doppler-shifted positioning signal comprises:
determining at least one velocity using the first velocity meter; and
determining the at least one computed Doppler-shifted positioning signal for the at least one positioning signal using the at least one velocity.

18. The method of claim 16, further comprising coupling a second velocity meter to the at least one receiver.

19. The method of claim 18, wherein providing the at least one computed Doppler-shifted positioning signal comprises:
determining at least one velocity using the second velocity meter; and
determining the at least one computed Doppler-shifted positioning signal for the at least one positioning signal using the at least one velocity.

20. The method of claim 11, wherein generating the at least one positioning signal comprises generating at least one sequence, receiving the at least one positioning signal comprises receiving at least one sequence, providing the at least one computed Doppler-shifted positioning signal corresponding to the at least one positioning signal comprises providing at least one computed Doppler-shifted sequence corresponding to the at least one sequence, and determining the at least one propagation time delay from the source to the receiver using the generated positioning signal, the received positioning signal, and the at least one computed Doppler-shifted positioning signal comprises determining the at least one propagation time delay from the source to the receiver using the generated sequence, the received sequence, and the at least one computed Doppler-shifted sequence.

21. A method for forming a library, comprising:
determining a plurality of velocities;
selecting a plurality of positioning signals;
determining a plurality of computed Doppler-shifted positioning signals for each of the plurality of positioning signals using the plurality of velocities; and
providing an index to the plurality of computed Doppler-shifted positioning signals.

22. A method for forming a library, comprising:
determining a plurality of velocities, wherein determining the plurality of velocities comprises selecting a velocity ranges;
selecting a plurality of positioning signals;
determining a plurality of computed Doppler-shifted positioning signals for each of the plurality of positioning signals using the plurality of velocities; and
providing an index to the plurality of computed Doppler-shifted positioning signals.

23. The method of claim 22, wherein selecting the velocity range comprises selecting the velocity range extending from about 4 meters/second to about −4 meters/second.

24. A method for forming a library, comprising:
determining a plurality of velocities, wherein determining the plurality of velocities comprises selecting a velocity resolution;
selecting a plurality of positioning signals;
determining a plurality of computed Doppler-shifted positioning signals for each of the plurality of positioning signals using the plurality of velocities; and
providing an index to the plurality of computed Doppler-shifted positioning signals.

25. The method of claim 24, wherein selecting the velocity resolution comprises selecting the velocity resolution of 1 meter/second.

26. A method for forming a library, comprising:
determining a plurality of velocities;
selecting a plurality of positioning signals, wherein selecting the plurality of positioning signals comprises selecting one positioning signal for each of a corresponding plurality of seismic sources and seismic receivers;
determining a plurality of computed Doppler-shifted positioning signals for each of the plurality of positioning signals using the plurality of velocities; and
providing an index to the plurality of computed Doppler-shifted positioning signals.

27. A method for forming a library, comprising:
determining a plurality of velocities;
selecting a plurality of positioning signals, wherein selecting the plurality of positioning signals comprises selecting a plurality of sequences;
determining a plurality of computed Doppler-shifted positioning signals for each of the plurality of positioning signals using the plurality of velocities; and
providing an index to the plurality of computed Doppler-shifted positioning signals.

28. The method of claim 27, wherein selecting the plurality of sequences comprise selecting a plurality of separable sequences.

29. The method of claim 28, wherein selecting the plurality of separable sequences comprises selecting a plurality of substantially orthogonal sequences.

30. The method of claim 29, wherein selecting the plurality of substantially orthogonal sequences comprises selecting at least one of a plurality of Kasami sequences and a plurality of Maximal sequences.

31. The method of claim 27, wherein determining the plurality of computed Doppler-shifted positioning signals comprises determining a plurality of computed Doppler-shifted sequences.

32. The method of claim 31, wherein determining the plurality of computed Doppler-shifted sequences comprises determining a plurality of binary computed Doppler-shifted sequences.

33. The method of claim 32, wherein determining the plurality of binary computed Doppler-shifted sequences comprises determining the plurality of binary computed Doppler-shifted sequences using a threshold.

34. The method of claim 33, wherein determining the plurality of binary computed Doppler-shifted sequences using the threshold comprises transforming a value of the computed Doppler-shifted sequence to +1 or −1 using the threshold.

35. The method of claim 21, further comprising storing the library.

36. A library comprising a data structure encoded on a computer-readable storage medium, wherein the library comprises:
 a plurality of computed Doppler-shifted positioning signals formed by:
  determining a plurality of velocities;
  selecting a plurality of positioning signals; and
  determining the plurality of computed Doppler-shifted positioning signals for each of the plurality of positioning signals using the plurality of velocities; and
 an index of the plurality of computed Doppler-shifted positioning signals.

37. A library comprising a data structure encoded on a computer-readable storage medium, wherein the library comprises:
 a plurality of computed Doppler-shifted positioning signals formed by:
  determining a plurality of velocities:
  selecting a plurality of positioning signals, wherein the positioning signals are sequence; and
  determining the plurality of computed Doppler-shifted positioning signals for each of the plurality of positioning signals using the plurality of velocities; and
 an index of the plurality of computed Doppler-shifted positioning signals.

38. The library of claim 37, wherein the sequences are orthogonal sequences.

39. The library of claim 38, wherein the orthogonal sequences are at least one of a Kasami sequence and a Maximal sequence.

* * * * *